US011399463B2

(12) United States Patent
Seiders, Jr. et al.

(10) Patent No.: US 11,399,463 B2
(45) Date of Patent: Aug. 2, 2022

(54) METHOD FOR CONTROLLING THE HEIGHT OF A HARVESTING IMPLEMENT RELATIVE TO THE GROUND AND RELATED HEIGHT CONTROL SYSTEMS

(71) Applicant: CNH Industrial America LLC, New Holland, PA (US)

(72) Inventors: Kenneth Seiders, Jr., Elizabethtown, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 467 days.

(21) Appl. No.: 16/428,561

(22) Filed: May 31, 2019

(65) Prior Publication Data

US 2020/0375106 A1    Dec. 3, 2020

(51) Int. Cl.
*A01D 41/14* (2006.01)
*A01D 34/54* (2006.01)
(Continued)

(52) U.S. Cl.
CPC .......... *A01D 41/141* (2013.01); *A01D 34/54* (2013.01); *A01D 41/145* (2013.01); *A01D 34/008* (2013.01); *A01D 34/74* (2013.01)

(58) Field of Classification Search
CPC ... A01D 34/008; A01D 41/141; A01D 41/145
See application file for complete search history.

(56) References Cited

U.S. PATENT DOCUMENTS 4,776,153 A * 10/1988 DePauw .............. A01D 41/145
                                                        56/10.2 E
7,630,808 B2   12/2009 Behnke et al.
(Continued)

FOREIGN PATENT DOCUMENTS

CA         2997798 A1 *  9/2018 ............. A01D 34/04
CN      106233921 A1    12/2016
(Continued)

OTHER PUBLICATIONS

Extended European Search Report for EP Application No. 20177268.8 dated Dec. 4, 2020 (six pages).

*Primary Examiner* — Adam J Behrens
(74) *Attorney, Agent, or Firm* — Peter Zacharias; Patrick Sheldrake

(57) ABSTRACT

A method for automatically controlling a height of a harvesting implement of an agricultural vehicle relative to a ground surface includes receiving height data from a plurality of height sensors spaced apart relative to the harvesting implement with a known spatial relationship and analyzing the height data in combination with position data associated with the known spatial relationship of the plurality of height sensors to establish a correlation between the height data and the position data. In addition, the method includes determining at least one control output for controlling an operation of a height cylinder and a tilt cylinder provided in operative association with the harvesting implement based on the established correlation, and controlling the operation of the height cylinder and/or the tilt cylinder based on the control output(s) to adjust the vertical positioning and/or the lateral tilt of the harvesting implement relative to the ground surface.

17 Claims, 5 Drawing Sheets

(51) Int. Cl.
*A01D 34/00* (2006.01)
*A01D 34/74* (2006.01)

(56) References Cited

U.S. PATENT DOCUMENTS

| | | | |
|---|---|---|---|
| 7,647,752 | B2 | 1/2010 | Schlipf |
| 9,668,412 | B2 | 6/2017 | Ritter et al. |
| 9,693,502 | B2 | 7/2017 | Gofron et al. |
| 2011/0099962 | A1* | 5/2011 | Coers ................ A01D 41/141 56/10.4 |
| 2015/0033692 | A1* | 2/2015 | Schroeder ............ A01D 41/141 56/10.2 E |
| 2017/0013773 | A1* | 1/2017 | Kirk ........................ G01S 19/13 |
| 2018/0098491 | A1* | 4/2018 | Long .................... A01D 41/141 |
| 2018/0192587 | A1* | 7/2018 | Berggren ............. A01D 75/285 |
| 2018/0271016 | A1 | 9/2018 | Milano et al. |
| 2018/0332767 | A1 | 11/2018 | Muench et al. |
| 2018/0359920 | A1 | 12/2018 | Dunn et al. |
| 2019/0059223 | A1* | 2/2019 | Seiders, Jr. .......... A01D 41/141 |
| 2020/0073389 | A1* | 3/2020 | Flajolet ................ A01B 69/004 |

FOREIGN PATENT DOCUMENTS

| | | | |
|---|---|---|---|
| EP | 1386531 | A1 | 2/2004 |
| WO | WO 2014/023632 | A1 | 2/2014 |
| WO | 2019046773 | A1 | 3/2019 |

* cited by examiner

METHOD FOR CONTROLLING THE HEIGHT OF A HARVESTING IMPLEMENT RELATIVE TO THE GROUND AND RELATED HEIGHT CONTROL SYSTEMS

FIELD OF THE INVENTION

The present subject matter relates generally to harvesting implements for agricultural vehicles, and, more particularly, to methods for controlling the height of a harvesting implement relative to a ground surface and related height control systems.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

Conventionally, the operation of most harvesters requires substantial operational involvement and control by the operator. For example, with reference to a combine, the operator is typically required to control various operating parameters, such as the direction of the combine, the speed of the combine, the height of the combine header, the air flow through the combine cleaning fan, the amount of harvested crop stored on the combine, and/or the like. To address such issues, many current combines utilize an automatic header height control system that attempts to maintain a constant cutting height above the ground regardless of the ground contour or ground position relative to the base combine. For instance, it is known to utilize electronically controlled height and tilt cylinders to automatically adjust the height and lateral orientation, or tilt, of the header relative to the ground based on sensor measurements received from a plurality of sensors. In such multi-input multi-output (MIMO) control systems, it is typical that the number of inputs (i.e., sensor inputs) is greater than the number of outputs (height and tilt cylinder control output). As a result, to provide for accurate control, the greater number of control inputs must be fused or interpreted into a single control variable for each control output. To date, automatic header height control systems lack the capability of efficiently and effectively fusing multiple sensor input signals into a single control variable in a manner that minimizes or reduces the total ground displacement error for the header.

Accordingly, an improved method and related system for controlling the height of a harvesting implement relative to the ground that addresses one or more of the issues identified above would be welcomed in the technology. For instance, an improved method and related system that allows for multiple sensor inputs to be fused into a single control variable for controlling the height of a harvesting implement relative to the ground would be welcomed in the technology.

BRIEF DESCRIPTION OF TI-IE INVENTION

Aspects and advantages of the invention will be set forth in part in the following description, or may be obvious from the description, or may be learned through practice of the invention.

In one aspect, the present subject matter is directed to a method for automatically controlling a height of a harvesting implement of an agricultural work vehicle relative to a ground surface. The harvesting implement is provided in operative association with both a height cylinder configured to adjust a vertical positioning of the harvesting implement relative to the ground surface and a tilt cylinder configured to adjust a lateral tilt of the harvesting implement relative to the ground surface. The method may include receiving, with a computing device, height data from a plurality of height sensors spaced apart relative to the harvesting implement with a known spatial relationship and analyzing, with the computing device, the height data in combination with position data associated with the known spatial relationship of the plurality of height sensors to establish a correlation between the height data and the position data. In addition, the method may include determining, with the computing device, at least one control output for controlling an operation of the height cylinder and the tilt cylinder based on the established correlation, and controlling, with the computing device, the operation of at least one of the height cylinder or the tilt cylinder based on the at least one control output to adjust at least one of the vertical positioning or the lateral tilt of the harvesting attachment relative to the ground surface.

In another aspect, the present subject matter is directed to a height control system for an agricultural work vehicle. The system may include a harvesting attachment, a height cylinder configured to adjust a vertical positioning of the harvesting implement relative to a ground surface, and a tilt cylinder configured to adjust a lateral tilt of the harvesting implement relative to the ground surface. The system may also include a plurality of height sensors spaced apart relative to the harvesting implement with a known spatial relationship, with each height sensor configured to generate height data indicative of a local distance defined between the harvesting attachment and the ground surface at a respective location of said height sensor. In addition, the system may include a controller communicatively coupled to the plurality of height sensors, with the controller including a processor and associated memory. The memory stores instructions that, when executed by the processor, configure the controller to analyze the height data received from the height sensors in combination with position data associated with the known spatial relationship of the height sensors to establish a correlation between the height data and the position data, determine at least one control output for controlling an operation of the height cylinder and the tilt cylinder of the work vehicle based on the established correlation, and control the operation of at least one of the height cylinder or the tilt cylinder based on the at least one control output to adjust at least one of the vertical positioning or the lateral tilt of the harvesting attachment relative to the ground surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
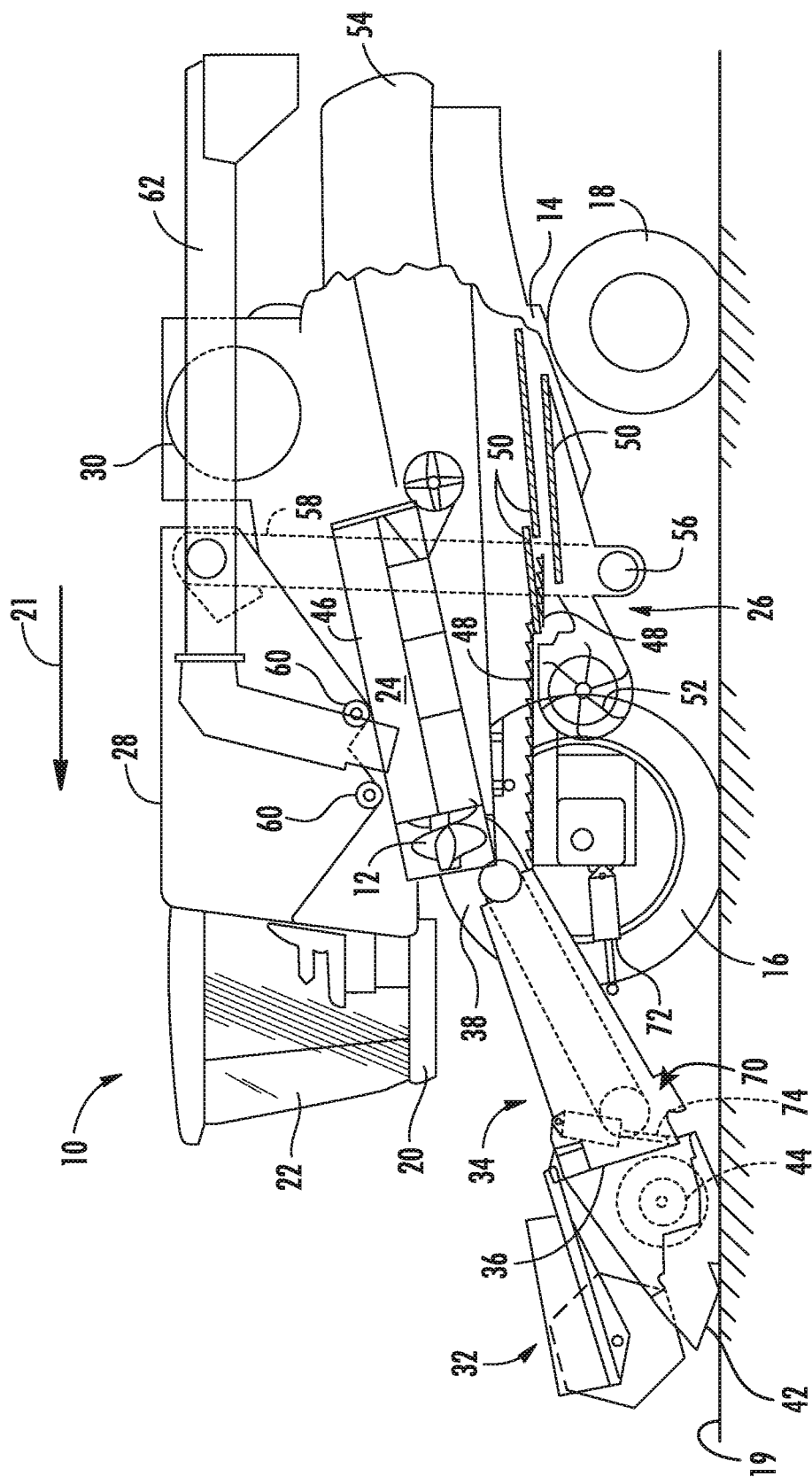
FIG. 1 illustrates a simplified, partial sectional side view of one embodiment of an agricultural harvester in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods for controlling the height of a harvesting implement relative to a ground surface and related height control systems. Specifically, in several embodiments, the disclosed system corresponds to a multi-input multi-output (MEMO) control system in which the number of control inputs exceeds the number of control outputs. For example, while the header height control system may include two control outputs (i.e., control of the height cylinder and the tilt cylinder(s)), the system may generally include more than two control inputs in the form of local height measurements received from three or more height sensors provided in operative association with the harvesting attachment. To accommodate the greater number of input signals, a controller of the disclosed system may be configured to fuse the sensor data into a single control variable for each control output that minimizes or reduces the total ground displacement error for the harvesting attachment.

In several embodiments, the system controller may be configured to perform a regression analysis to fuse the input signals received from the various height sensors. Specifically, in one embodiment, the controller may be configured to perform a linear regression analysis to establish a mathematical relationship or correlation between the height data received from the sensors and the spatial relationship between the sensors and the harvesting attachment. For instance, by knowing the lateral positioning of the sensors along the harvesting attachment relative to a given reference point (e.g., a lateral centerline of the harvesting attachment), the controller may determine a regression line or formula that correlates the height data received from the sensors to the associated sensor position data. In such an embodiment, the results of regression analysis may serve as a single control variable for generating control outputs for controlling the operation of both the height cylinder and the tilt cylinder(s). For instance, in one embodiment, the regression slope determined via the regression analysis may be used to generate a tilt control output for the tilt cylinder(s), while a given height value determined via the regression analysis (e.g., a y-intercept value) may be used to generate a height control output for the height cylinder.

Referring now to the drawings, FIG. 1 illustrates a simplified, partial sectional side view of one embodiment of a work vehicle, such as an agricultural harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement (indicated by arrow 21 in FIG. 1) relative to the ground surface 19. Additionally, an operator's platform 20 with an operator's cab 22, a threshing and separating assembly 24, a grain cleaning assembly 26 and a holding tank 28 may be supported by the frame 14. Additionally, as is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed, or the like, is loosened and separated from the straw.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 70 which is configured to adjust a height of the header 32 relative to the ground surface 19 so as to maintain the desired cutting height between the header 32 and the ground surface 19. The hydraulic system 70 may include a height cylinder 72 configured to adjust the height or vertical positioning of the header 32 relative to the ground. For example, in some embodiments, the height cylinder 72 may be coupled between the feeder 34 and the frame 14 such that the height cylinder 72 may pivot the feeder 34 to raise and lower the header 32 relative to the ground 19. In addition, the hydraulic system 70 may include a tilt cylinder(s) 74 coupled between the header 32 and the feeder 34 to allow the header 32 to be tilted relative to the ground surface 19 or pivoted laterally or side-to-side relative to the feeder 34.

Figure 2:
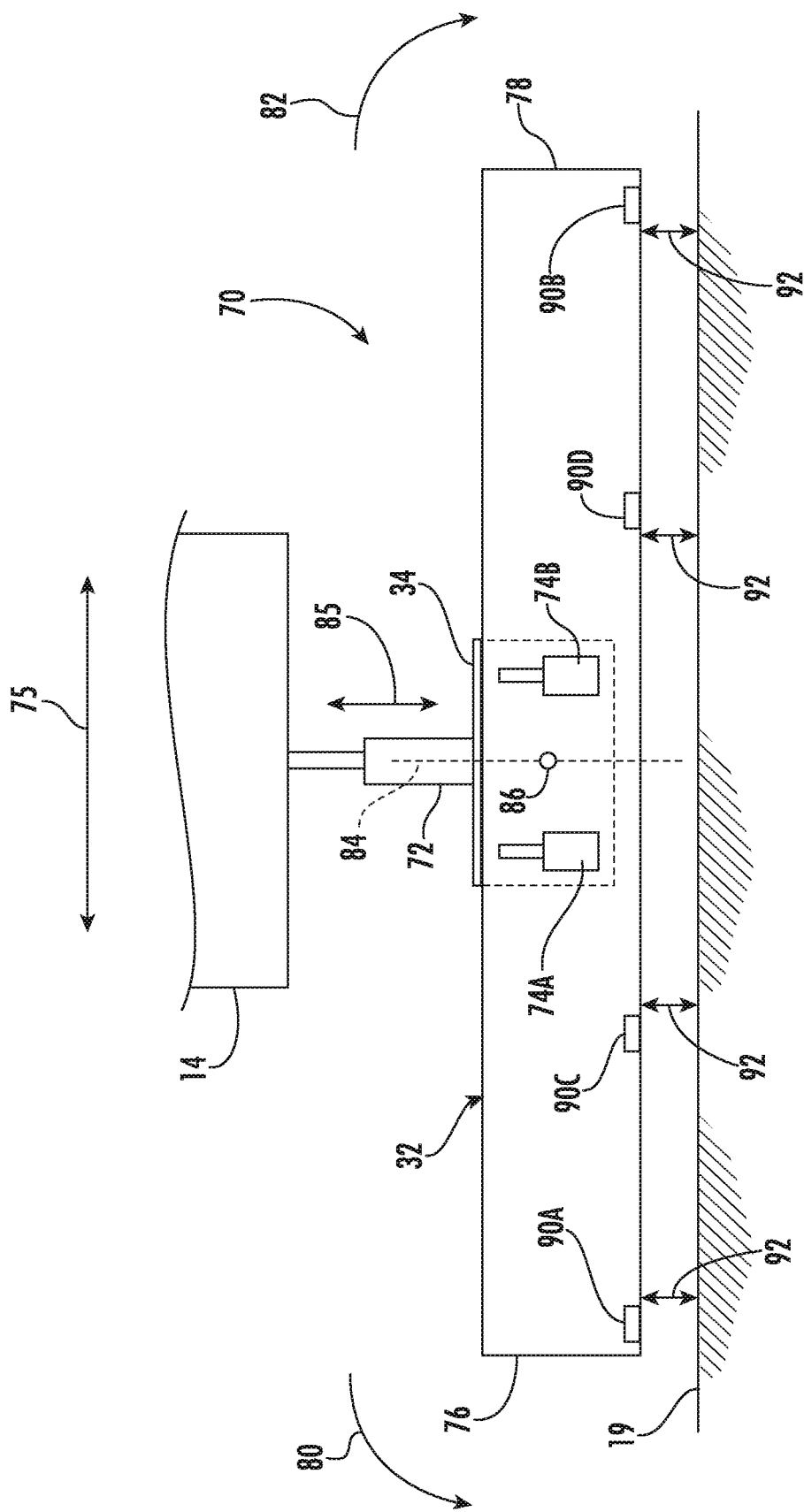
FIG. 2 illustrates a simplified, schematic view of one embodiment of a harvesting attachment and related hydraulic system for an agricultural harvester in accordance with aspects of the present subject matter.

Referring now to FIG. 2, a simplified, schematic view of one embodiment of the header 32 and associated hydraulic system 70 described above with reference to FIG. 1 is illustrated in accordance with aspects of the present subject matter. As shown, the header 32 may generally extend side-to-side or in a lateral direction (indicated by arrow 75 in FIG. 2) between a first lateral end 76 and a second lateral end 78. Additionally, the header 32 may be pivotably coupled to the feeder 34 at a location between its first and second lateral ends 76, 78 to allow the header 32 to tilt laterally relative to the feeder 34 (e.g., in the tilt directions indicated by arrows 80, 82 in FIG. 2). In one embodiment, the header 32 may be coupled to the feeder 34 roughly at a lateral centerline 84 defined between the opposed lateral ends 76, 78 of the header 32. In such an embodiment, the height cylinder 72 may, for instance, be configured to raise and lower the end of the feeder 34 relative to the frame 14 of the harvester, thereby adjusting the vertical positioning of the header 32 along the lateral centerline 84 (e.g., in the vertical direction indicated by arrow 85). Additionally, the lateral tilt cylinder(s) 74 may be configured to laterally tilt the header 32 relative to the ground 19 (e.g., as indicated by arrows 80, 82) about a tilt axis 86 aligned with the lateral centerline 84 of the header 32.

In one embodiment, the hydraulic system 70 may include a pair of tilt cylinders 74. For instance, as shown in FIG. 2, a first tilt cylinder 75A may be coupled between the header 32 and the feeder 34 along one lateral side of the connection between the header 32 and the feeder 34, and a second tilt cylinder 74B may be coupled between the header 32 and the feeder 34 along the opposed lateral side of the connection between the header 32 and the feeder 34. In such an embodiment, the tilt cylinders 74A, 7B may be extended and retracted to pivot or tilt the header 32 about the tilt axis 86 of the header 32. However, in other embodiments, the hydraulic system 70 may only include a single tilt cylinder 74, such as a cylinder coupled between the header 32 and the feeder 34 in the lateral direction 75 across the centerline 74 of the header 32 at a position vertically above or below the tilt axis 86.

In general, the operation of the height cylinder 72 and tilt cylinder(s) 74 may be controlled (e.g., via an associated controller) to adjust the vertical positioning and tilt angle of the header 32 relative to the ground surface 19. For instance, a plurality of height sensors 90 may be provided on the header 32 to monitor one or more respective local distances or heights 92 defined between the header 32 and the ground surface 19. Specifically, as shown in FIG. 2, the header 32 includes four height sensors 90 supported thereon for monitoring the local height 92 relative to the ground surface 19, such as by including a first height sensor 90A positioned adjacent to the first lateral end 76 of the header 32, a second height sensor 90B positioned adjacent to the second lateral end 78 of the header 32, and third and fourth height sensors 90C, 90D positioned between the first and second height sensors 90A, 90B along either side of the header centerline 84 in the illustrated embodiment, the height sensors 90 are spaced apart equally along the lateral width of the header 32. However, in other embodiments, the lateral spacing between the various height sensors 90 may be non-uniform or varied. It should also be appreciated that, although the header 32 is illustrated herein as including four height sensors 90, any number of height sensors 90 may be installed relative to the header 32 to provide an indication of the local height 92 defined between the header 32 and the ground surface 19 at a corresponding number of lateral sensor positions spaced apart across the width of the header 32.

It should be appreciated that each height sensor 90 may generally correspond to any suitable sensing device configured to provide sensor data indicative of the local height or distance 92 defined between the header 32 and the ground surface 19 at the installed location of such sensor 90. In the illustrated embodiment, the height sensors 90 comprise non-contact height sensors, such as laser sensors, radar sensors, ultrasonic sensors, and/or the like. Alternatively, the height sensors 90 may comprise contact-based or mechanical height sensors. For instance, in one embodiment, the height sensors 90 may be coupled to mechanical feelers or pivot arms that are configured to contact the ground and pivot up/down with changes in the ground contour, thereby allowing the sensors 90 to detect variations in the local height 92.

As will be described in greater detail below, the height data provided by the various height sensors 90 may be used as a control input for controlling the operation of both the height cylinder 72 and the tilt cylinder(s) 74. Specifically, in accordance with aspects of the present subject matter, the height data may be analyzed in combination with the known spatial relationship between the sensors 90 and the header 32 to determine a single control variable for controlling the operation of the cylinders 72, 74.

Figure 3:
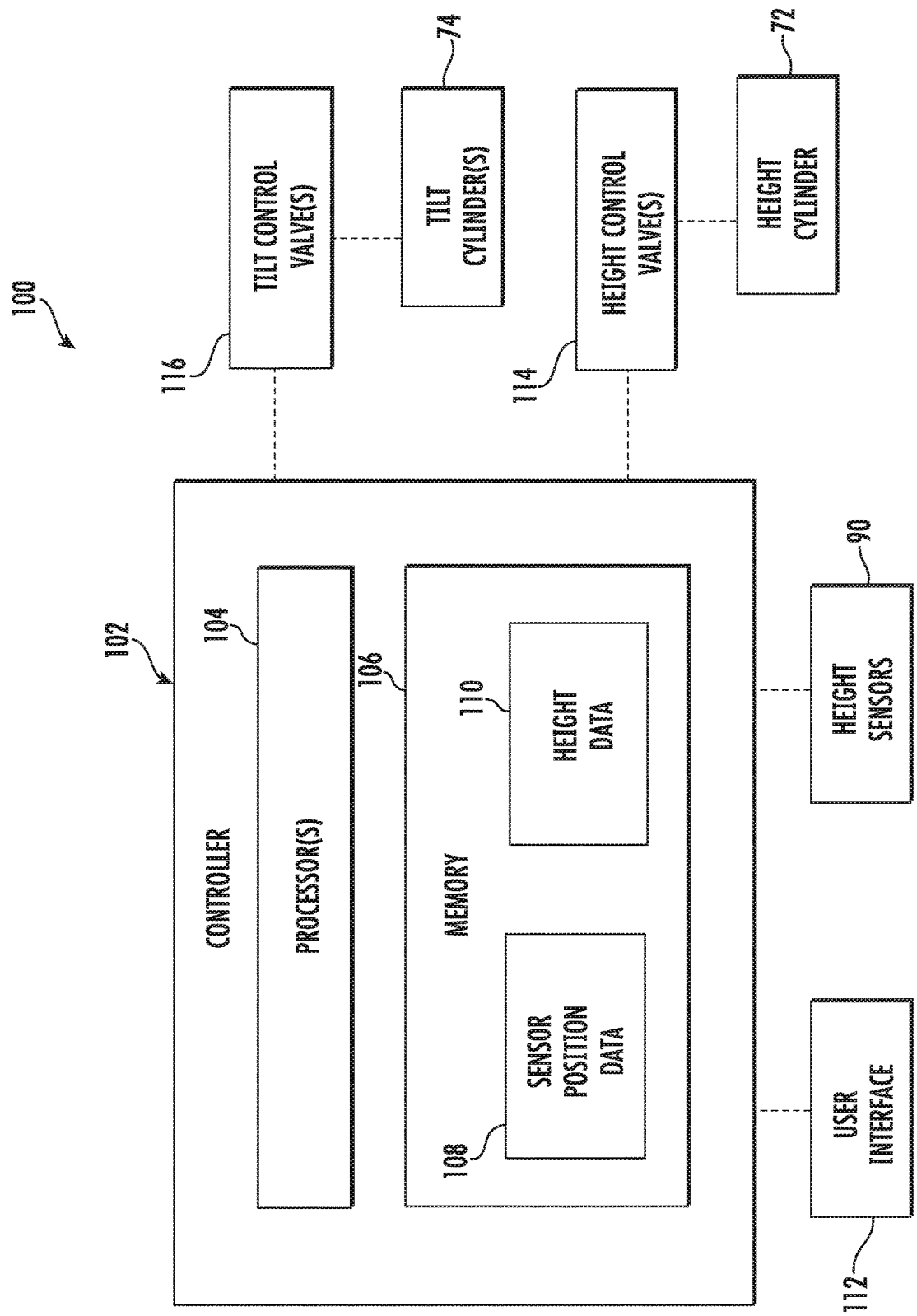
FIG. 3 illustrates a schematic view of one embodiment of a system for controlling the height of an agricultural implement relative to the ground in accordance with aspects of the present subject matter.

Referring now to FIG. 3, a schematic view of one embodiment of a control system 100 for automatically controlling the height of a harvesting implement (such as the header 32 of the harvester 10 described above) relative to the ground surface is illustrated in accordance with aspects of the present subject matter. In general, the control system 100 will be described herein with reference to the harvester 10 and header 32 illustrated in FIGS. 1 and 2. However, it should be appreciated that the disclosed control system 100 may be used to control the height of any suitable harvesting implement having any suitable implement configuration in association with any suitable agricultural work vehicle having any other suitable vehicle configuration.

As shown, the control system 100 may generally include a controller 102 installed on and/or otherwise provided in operative association with the harvester 10. In general, the controller 102 of the disclosed system 100 may correspond to any suitable processor-based device(s), such as a computing device or any combination of computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, hut also refers to a controller, a microcontroller, a microcomputer, a programmable logic controller (PLC), an application specific integrated circuit, and other programmable circuits. Additionally, the memory device(s) 106 of the controller 102 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s) 104, configure the controller 102 to perform various computer-implemented functions, such as one or more aspects of the method 200 described below with reference to FIG. 6.

In one embodiment, the memory 106 of the controller 102 may include one or more databases for storing information associated with the operation of the harvester 10, including data associated with controlling the height of the header 32. For instance, as shown in FIG. 3, the memory 106 may include a sensor position database 108 storing position data associated with relative positions of the height sensors 90 along the header 32. Specifically, in several embodiments, the database 108 may include lateral position data associated with the lateral spacing or positioning of the height sensors 90 across the header 32 in the lateral direction 75 (FIG. 2). As will be described below, such position data may be used by the controller 102 to establish a known spatial relationship between the height sensors 90 and the header 32. For instance, in one embodiment, the position data may be indicative of the lateral spacing or distance defined between each height sensor 90 and a fixed reference point on the header 32, such as the lateral spacing between each height sensor 90 and the lateral centerline 84 of the header 32. In such instance, the position data may be used the controller 102 to establish a known spatial relationship between the height sensors 90 and the fixed reference point on the header 32.

Additionally, as shown in FIG. 3, the memory 106 may include a height database 110 storing height data indicative of the local height or distance measurements provided by the height sensors 90. Specifically, the controller 102 may be commutatively coupled to each of the height sensors 90 to allow the height-related data generated by the sensors 90 to be transmitted to the controller 102. As such, the controller 102 may be configured to continuously monitor the local height or distance 92 (FIG. 2) defined between the header 32 and the ground surface 19 at each respective location of the height sensors 90. In doing so, the local height data provided by each height sensor 90 may be combined with associated position data for such height sensor 90 (e.g., the lateral position data stored within the sensor position database 108) to map or chart the detected header height at each sensor location relative to the header 32. For instance, as indicated above, the position data may correlate the lateral positioning of each height sensor 90 to a fixed reference point on the header 32 (e.g., the lateral centerline 84). Thus, by monitoring the height data provided by each height sensor 90, a plurality of data points may be collected that indicate the height or distance defined between the header 32 and the ground surface 19 at the various locations across the header 19 corresponding to the installed locations of the sensors 90. As will be described below, such data points may be used by the controller 102 to establish a single control variable or correlation between height/position data for generating control outputs used to control the operation of the height and tilt cylinders 72, 74

It should be appreciated that controller 102 may also include various other suitable components, such as a communications circuit or module, a network interface, one or more input/output channels, a data/control bus and/or the like, to allow the controller 102 to be communicatively coupled with any of the various other system components described herein.

Moreover, as shown in the illustrated embodiment, the controller 102 may be communicatively coupled to a user interface 112 of the harvester 10. In general, the user interface 112 may correspond to any suitable input device(s) configured to allow the operator to provide operator inputs to the controller 102, such as a touch screen display, a keyboard, joystick, buttons, knobs, switches, and/or combinations thereof located within the cab 22 of the harvester 10. The operator may provide various inputs into the system 100 via the user interface 122. In one embodiment, suitable operator inputs may include, but are not limited to, a target height for the header 32, a target height range for the header 32, and/or any other parameter associated with controlling the height of the header 32. In addition, the user interface 112 may also be configured to provide feedback (e.g., feedback associated with the local height(s) detected by the sensors 90 and/or feedback associated with an operator selected target height and/or height range of the header 32) to the operator. As such, the user interface 112 may include one or more output devices (not shown), such as display screens, speakers, warning lights, and/or the like, which are configured to provide feedback from the controller 102 to the operator.

Referring still to FIG. 3, the controller 102 may generally be configured to control the operation of one or more components of the harvester 10. For instance, in several embodiments, the controller 102 may be configured to control the operation of one or more components that regulate the height of the header 32 relative to the ground surface 19, such as the height cylinder 72 and the tilt cylinder(s) 74. For example, in embodiments in which the cylinders 72, 74 correspond to fluid-driven actuators, the controller 102 may be communicatively coupled to one or more control valve(s) 114, 116 configured to regulate the supply of fluid (e.g., hydraulic fluid or air) to each cylinder. Specifically, as shown in FIG. 3, the controller 102 may be coupled to one or more height control valves 114 for regulating the supply of fluid to the height cylinder 72 and one or more tilt control valves 116 for regulating the supply of fluid to the tilt cylinder(s) 74. In such an embodiment, the controller 102 may be configured to control the operation of each cylinder 72, 74 by controlling the operation of its respective control valve(s) 114, 116. For instance, the controller 102 may be configured to transmit suitable control outputs (e.g., current commands) to each control valve 114, 116 to adjust its associated valve position, thereby allowing the controller 102 to vary the supply of fluid to the corresponding cylinder(s) 72, 74 and, thus, automatically control the retraction/extension of such cylinder(s) 72, 74. Alternatively, in embodiments in which the cylinders 72, 74 correspond to electric-driven actuators (e.g., solenoid actuated cylinders), the controller 102 may be configured to transmit suitable control outputs (e.g., current commands) to each associated solenoid to automatically control the retraction/extension of the respective cylinder(s) 72, 74.

In accordance with aspects of the present subject matter, the controller 102 may be configured to control the operation of both the height cylinder 72 and the tilt cylinder 74 to maintain the height of the header 32 at a desired or predetermined height setting value(s), such as an operator selected target height or target height range. In doing so, the control of both the height cylinder 72 and the tilt cylinder(s) 74 must be coordinated to ensure desired height control based on the various inputs from the height sensors 90. As indicated above, the system 100 may correspond to a multi-input multi-output (MIMO) control system including more control inputs (e.g., the four control inputs based on local height measurements from the sensors 90) than control outputs (e.g., two control outputs providing independent control of the height cylinder 72 and the tilt cylinder(s) 74). As a result, the greater number of sensor inputs must be fused or interpreted into a single control variable for each control output. In this regard, as will be described below, the controller 102 may be configured to analyze the height data received from the sensors 90 in combination with position data associated with the known spatial relationship of the height sensors 90 relative to the header 32 to establish a correlation (e.g., a mathematical relationship) between such data. For instance, the controller 102 may be configured to perform a regression analysis (e.g., a linear regression) that correlates the height data to the known spatial relationship between the height sensors 90 and the header 23. This correlation may then be used to generate suitable control commands for controlling the operation of both the height cylinder 72 and the tilt cylinder(s) 74.

Figure 4:
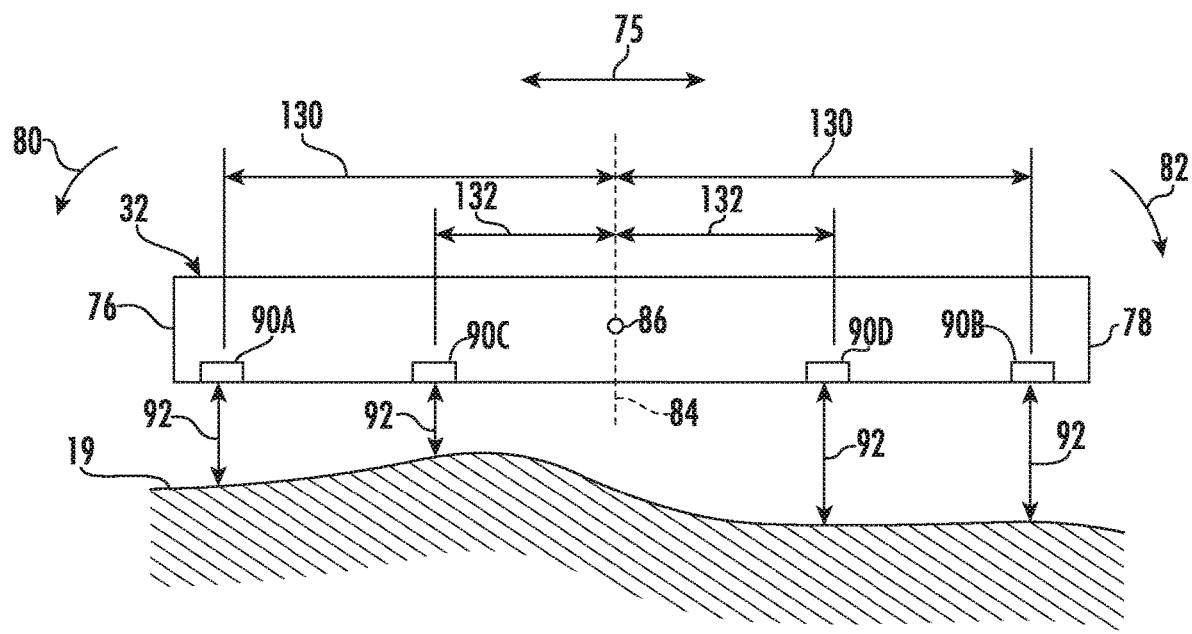
FIG. 4 illustrates an exemplary schematic view of one embodiment of a harvesting attachment positioned relative to the ground surface in accordance with aspects of the present subject matter, particularly illustrating height sensors installed on the harvesting attachment for detecting local variations in the ground surface profile.

An example analysis that may be performed by the controller 102 to correlate the height data received from the height sensors 90 and the associated sensor position data will now be described with reference to FIGS. 4 and 5. FIG. 4 illustrates a schematic view of the header 32 and height sensors 90 described above with reference to FIG. 2 positioned relative to a varying ground surface profile 19. Additionally, FIG. 5 illustrates an exemplary graph plotting the local height or distance measurements provided by each height sensor 90 (i.e., along the y-axis) relative to the spatial relationship or lateral positioning of the height sensors 90 across the header 32 (i.e., along the x-axis).

As particularly shown in FIG. 4, the various height sensors 90 may, in several embodiments, have a known spatial relationship relative to a fixed reference point on the header 32. Specifically, in the illustrated embodiment, each sensor 90 is shown as being spaced apart from the lateral centerline 84 of the header 32 by a given lateral distance defined in the lateral direction 75 of the header 32. For example, as shown in FIG. 4, the first and second height sensors 90A, 90B are generally spaced equidistant from the centerline 84 along each side of the header 32 by a first lateral distance 130, while the third and fourth height sensors 90A, 90B are generally spaced equidistant from the centerline 84 by a second, shorter lateral distance 13'2. By knowing these lateral distances 140, 132, a known spatial relationship may be established between each sensor 90 and the header 32. It should be appreciated that the relative positioning of the sensors 90 shown in FIG. 4 is simply illustrated to provide an example for purposes of describing the present subject matter. In other embodiments, the height sensors 90 may be positioned at varying distances relative to the centerline 84. Moreover, it should be appreciated that the spatial relationship defined between the sensors 90 and the header 32 may be established relative to any other suitable reference point other than the centerline 84, such as one of the lateral ends 76, 78 of the header 32.

As indicated above, to establish a correlation between the height data and the spatial relationship between the height sensors 90 and the header 32, the controller 102 may be configured to perform a regression analysis, such as a linear regression analysis. For instance, FIG. 5 illustrates the results of a linear regression analysis performed by the controller 102 based on the local height measurements provided by the height sensors 90 indicating the local vertical distance defined between the header 32 and the ground surface 19 shown in FIG. 4. As shown, the height data has been plotted relative to the lateral sensor spacing associated with the specific spatial relationship between the height sensors 90 and the header 32 described above with reference to FIG. 4, with the lateral centerline 84 of the header 32 being plotted at "zero" position along the x-axis.

Figure 5:
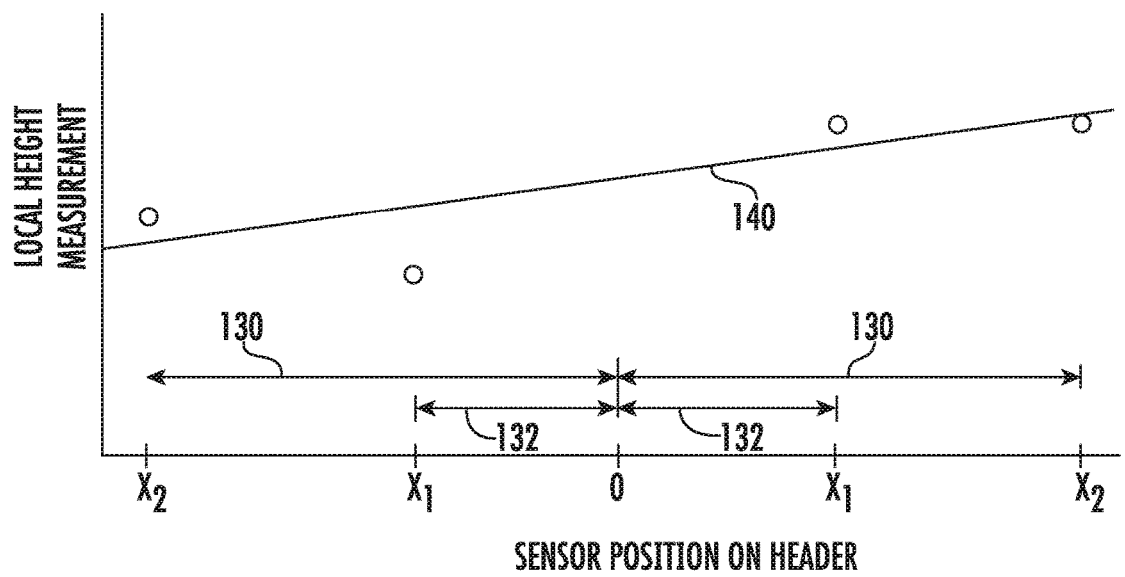
FIG. 5 illustrates an exemplary graph plotting the local height of the harvesting attachment of FIG. 4 relative to the ground (y-axis) relative to the spatial relationship or lateral positioning of the height sensors across the harvesting attachment of FIG. 4 (x-axis), particularly illustrating a regression line established for the height/position data.

By performing the linear regression analysis on the data represented in the exemplary plot shown in FIG. 5, the controller 102 may establish a mathematical relationship between the height data and associated sensor position data, which is represented in the plot by the best-fit or regression line 140. For instance, the mathematical relationship may be defined by the following linear regression formula (equation 1):

$$y = mx + b \qquad (1)$$

wherein, y corresponds to the height or distance between the header 32 and the ground surface 19, x corresponds to the distance of each sensor 90 from the lateral centerline 84 of the header 32, m corresponds to the regression slope as determined via the regression analysis (i.e., the slope of the regression line 140), and h corresponds to a height value associated with the centerline 84 of the header 32 as determined via the regression analysis (i.e., the y-intercept of the regression line 140).

In accordance with aspects of the present subject matter, the mathematical relationship established between the height data and associated sensor position data via the linear regression analysis can be used as a single control variable for determining the control outputs or commands used to control the operation of both the tilt cylinder(s) 74 and the height cylinder 72. For instance, in several embodiments, the control command associated with the controlling the operation of the tilt cylinder(s) 74 may be determined as a function of (or based upon) the regression slope calculated via the regression analysis (i.e., m from Equation 1), while the control command associated with the controlling the operation of the height cylinder 72 may be determined as a function of (or based upon) the height value calculated via the regression analysis that is associated with the centerline 84 of the header 32, which in the exemplary plot of FIG. 5 corresponds to the y-intercept value for the regression line 140 (i.e., b from Equation 1).

By using the regression slope to determine the tilt control command(s) for the tilt cylinder(s) 74, the direction of the slope (e.g., positive or negative) may indicate the desired direction in which the header 32 should be tilted about its tilt axis 86. Specifically, a positive regression slope may indicate that the header 32 should be tilted in one direction while a negative regression slope may indicate that header 32 should be tilted in the opposite direction. For instance, in the example shown in FIGS. 4 and 5, the positive slope of the regression line 140 indicates that the header 32 should be tilted about its tilt axis 86 in the tilt direction indicated by arrow 82 in FIG. 4 to accommodate the detected variations in the profile of the ground surface 19. However, if the regression line 140 had a negative slope, the header 32 would, instead, need to be tilted be tilted about its tilt axis 86 in the opposite tilt direction (e.g., as indicated by arrow 80 in FIG. 4). Similarly, the magnitude of the regression slope may indicate the degree to which the header 32 should be tilted. Specifically, in several embodiments, a direct or proportional relationship may exist between the magnitude of the regression slope and the degree to which the header 32 should be tilted such that the magnitude of the required tilt adjustment generally increases as the magnitude of the regression slope increases and generally decreases as the magnitude of the regression slope decreases.

It should be appreciated that the relationship between the slope calculated via the regression analysis and the required control output or command for controlling the tilt cylinder(s) 74 may be stored within the controller's memory 106. For instance, in one embodiment, a look-up table may be stored within the controller's memory 106 that correlates the calculated regression slope to a corresponding a control output for the tilt cylinder(s) 74. As such, upon calculating the regression slope, the controller 102 may reference the look-up table to determine the corresponding tilt control output.

As indicated above, a non-zero regression slope (whether positive or negative) may generally indicate that a tilt adjustment is required, thereby necessitating an adjustment in the degree of extension/retraction of the tilt cylinder(s) 74. However, if the local height detected by each height sensor 90 is the same, the resulting regression slope will be equal to zero. In such instance, the controller 102 may determine that no tilt adjustment is necessary, in which case the controller 102 may control the operation of the tilt cylinder(s) 74 such that the cylinder(s) 74 is maintained at its current actuator position.

Additionally, as indicated above, the control output or command associated with the controlling the operation of the height cylinder 72 may be determined as a function of (or based upon) the height value associated with the centerline 84 of the header 32 (referred to hereinafter as the "centerline height value") as calculated via the regression analysis. In the illustrated embodiment of FIG. 5, the centerline 84 of the header 32 is plotted along the x-axis at the zero x-position such that associated centerline height value corresponds to the y-intercept value for the regression line 140. Of course, in the event the position data is, instead, plotted relative to a different reference point (e.g., relative to one of the lateral ends 76, 78 of the header 32), the centerline height value will not correspond to y-intercept value, in which case such height value may, for example, be calculated by plugging in the "x-value" associated with the centerline 84 of the header 32 into Equation 1.

Regardless of how the centerline height value is determined, such height value may be used to determine an associated control output for controlling the operation of the height cylinder 72. Specifically, in several embodiments, the centerline height value may be compared to a predetermined height setting for the header 32, which may, for example, correspond to an operator-selected target height value for the header 32 or an operator-selected target height range for the header 32. In the event the centerline height value calculated via the regression analysis differs from the predetermined height setting, the controller 102 may be configured to control the operation of the height cylinder 72 to raise or lower the header 32 relative to the ground surface 19 based on the height differential between the height value/setting. For instance, if the predetermined height setting corresponds to a target height value, the controller 102 may be configured to control the operation of the height cylinder 72 to raise or lower the header 32 when the centerline height value is less than or greater than, respectively, the target height value. Similarly, if the predetermined height setting corresponds to a target height range, the controller 102 may be configured to control the operation of the height cylinder 82 to raise or lower the header 32 when the centerline height value falls below or increases above, respectively, the target height range.

It should be appreciated that the relationship between the height differential (e.g., calculated between the centerline height value and the predetermined height setting) and the required control output or command for controlling the height cylinder 72 may be stored within the controller's memory 106. For instance, in one embodiment, a look-up table may be stored within the controller's memory 106 that correlates the calculated height differential to a corresponding a control output for the height cylinder 72. As such, upon calculating the height differential, the controller 102 may reference the look-up table to determine the corresponding height control output for adjusting the centerline header height.

It should also be appreciated that, in instances in which the centerline height value does not differ from the predetermined height setting (e.g., when the centerline height value is equal to the target height value or falls within the associated target height range), the controller 102 may be configured to determine that no centerline height adjustment is necessary, in which case the controller 102 may control the operation of the height cylinder 72 such that the cylinder 72 is maintained at its current actuator position.

Figure 6:
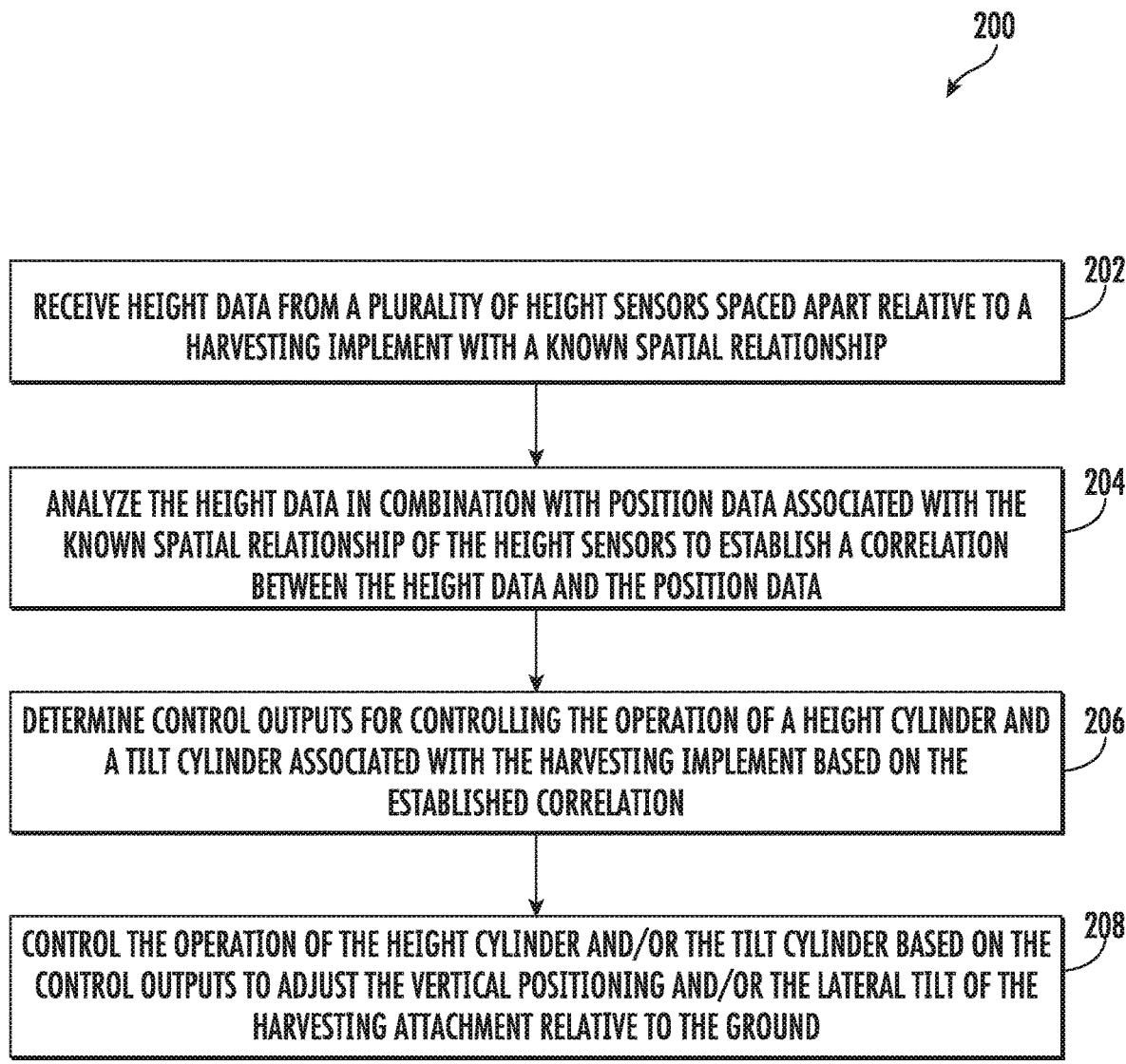
FIG. 6 illustrates a flow diagram of one embodiment of a method for controlling the height of an agricultural implement relative to the ground in accordance with aspects of the present subject matter.

Referring now to FIG. 6, a flow diagram of one embodiment of a method 200 for automatically controlling a height of a harvesting implement relative to a ground surface is illustrated in accordance with aspects of the present subject matter. For purposes of discussion, the method 200 will generally be described herein with reference to the header 32 shown in FIGS. 1 and 2 and the system 100 shown in FIG. 3. However, it should be appreciated that the disclosed method 200 may be executed to control the height of any suitable harvesting implement having any other suitable implement configuration and/or in association with any suitable system having any other suitable system configuration. Additionally, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202) the method 200 may include receiving height data from a plurality of height sensors spaced apart relative to a harvesting implement with a known spatial relationship. Specifically, as indicated above, the controller 102 may be communicatively coupled to a plurality of height sensors 90 spaced apart laterally across the header 32 such that a known spatial relationship exists between sensors 90 and the header 32. In such an embodiment, each sensor 90 may be configured to transmit height data to the controller 102 associated with a local height or distance 92 (FIG. 2) defined between the header 32 and the ground surface 19 at the installed location of the sensor 90.

Additionally, at (204), the method 200 may include analyzing the height data in combination with position data associated with the known spatial relationship of the height sensors to establish a correlation between the height data and the position data. For instance, as indicated above, the controller 102 may be configured to perform a regression analysis to establish a mathematical relationship between the corresponding height/position data points, such as a linear regression analysis that establishes a regression line 140 (FIG. 5) for the dataset.

Moreover, at (206), the method 200 may include determining control outputs for controlling the operation of a height cylinder and a tilt cylinder associated with the harvesting implement based on the established correlation. For instance, as indicated above, when controller 102 is configured to perform a regression analysis to establish a mathematical relationship between the height/position data points, a tilt control output(s) may be determined for controlling the operation of the tilt cylinder(s) 74 based on the calculated regression slope, while a height control output(s) may be determined for controlling the operation of the height cylinder 72 based on the centerline height value for the header 32 as determined via the regression analysis (e.g., based on a height differential between the centerline height value and a predetermined height setting for the header 32).

Referring still to FIG. 6, at (208), the method 200 may include controlling the operation of at least one of the height cylinder or the tilt cylinder based on the control outputs to adjust at least one of the vertical positioning or the lateral tilt of the harvesting attachment relative to the ground. For instance, as indicated above, when the regression slope corresponds to a non-zero slope value, the controller 102 may be configured to control the operation of the tilt cylinder(s) 74 to adjust the lateral tilt of the header 32 based on the tilt control output determined as a function of such slope value. Similarly, when a differential exists between the predetermined height setting for the header 32 and the associated centerline height value determined via the regression analysis, the controller 102 may be configured to control the operation of the height cylinder 72 to adjust the vertical positioning or height of the header 32 based on the height control output determined as a function of such height differential.

It is to be understood that the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 200, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically controlling a height of a harvesting implement of an agricultural work vehicle relative to a ground surface, the harvesting implement being provided in operative association with both a height cylinder configured to adjust a vertical positioning of the harvesting implement relative to the ground surface and a tilt cylinder configured to adjust a lateral tilt of the harvesting implement relative to the ground surface, the method comprising:
   receiving, with a computing device, height data from a plurality of height sensors spaced apart relative to the harvesting implement with a known spatial relationship;
   analyzing, with the computing device, the height data in combination with position data associated with the known spatial relationship of the plurality of height sensors to establish a correlation between the height data and the position data by performing a linear regression analysis, the established correlation being indicative of a regression line fit though a dataset including the height data and the position data;
   determining, with the computing device, a tilt control output for controlling the tilt cylinder based on a slope of the regression line of the established correlation; and
   controlling, with the computing device, an operation of at least one of the height cylinder or the tilt cylinder based on the tilt control output to adjust at least one of the vertical positioning or the lateral tilt of the harvesting implement relative to the ground surface.

2. The method of claim 1, wherein determining the tilt control output comprises at least one of determining a first tilt control output associated with controlling the operation of the tilt cylinder to tilt the harvesting implement in a first direction when the slope of the regression line is positive or determining a second tilt control output associated with controlling the operation of the tilt cylinder to tilt the harvesting implement in a second direction opposite the first direction when the slope of the regression line is negative.

3. The method of claim 1, wherein determining the tilt control output comprises determining a tilt control output associated with maintaining a current cylinder position of the tilt cylinder when the slope of the regression line is equal to zero.

4. The method of claim 1, wherein determining the at least one control output for controlling the operation of the height cylinder and the tilt cylinder comprises determining a height control output for controlling the operation of the height cylinder based on a height value defined along the regression line that is associated with a fixed reference point on the harvesting implement.

5. The method of claim 4, further comprising comparing the height value to a predetermined height setting for the harvesting implement.

6. The method of claim 5, wherein determining the height control output comprises determining a height control output for controlling the operation of the height cylinder in a manner that adjusts the vertical positioning of the harvesting implement when the height value differs from the predetermined height setting.

7. The method of claim 6, wherein the predetermined height setting is associated with a predetermined height range for the harvesting implement; and
wherein determining the height control output comprises determining a height control output for controlling the operation of the height cylinder in a manner that adjusts the vertical positioning of the harvesting implement when the height value falls outside the predetermined height range.

8. The method of claim 5, wherein determining the height control output comprises determining a height control output associated with maintaining a current cylinder position of the height cylinder when the height value does not differ from the predetermined height setting.

9. A height control system for an agricultural vehicle, the system comprising:
a harvesting implement;
a height cylinder configured to adjust a vertical positioning of the harvesting implement relative to a ground surface;
a tilt cylinder configured to adjust a lateral tilt of the harvesting implement relative to the ground surface;
a plurality of height sensors spaced apart relative to the harvesting implement with a known spatial relationship, each height sensor configured to generate height data indicative of a local distance defined between the harvesting implement and the ground surface at a respective location of said height sensor; and
a controller communicatively coupled to the plurality of height sensors, the controller including a processor and associated memory, the memory storing instructions that, when executed by the processor, configure the controller to:
analyze the height data received from the plurality of height sensors in combination with position data associated with the known spatial relationship of the plurality of height sensors to establish a correlation between the height data and the position data by performing a linear regression analysis, the established correlation being indicative of a regression line fit though a dataset including the height data and the position data;
determine a height control output for controlling the height cylinder based on a height value defined along the regression line of the established correlation that is associated with a fixed reference point on the harvesting implement; and
control an operation of at least one of the height cylinder or the tilt cylinder based on the height control output to adjust at least one of the vertical positioning or the lateral tilt of the harvesting implement relative to the ground surface.

10. The height control system of claim 9, wherein the controller is configured to determine a tilt control output for controlling the operation of the tilt cylinder based on a slope of the regression line.

11. The height control system of claim 10, wherein the controller is configured to determine the tilt control output by determining at least one of a first tilt control output associated with controlling the operation of the tilt cylinder to tilt the harvesting implement in a first direction when the slope of the regression line is positive or a second tilt control output associated with controlling the operation of the tilt cylinder to tilt the harvesting implement in a second direction opposite the first direction when the slope of the regression line is negative.

12. The height control system of claim 9, wherein the controller is further configured to compare the height value to a predetermined height setting for the harvesting implement.

13. The height control system of claim 12, wherein the controller is configured to determine the height control output for controlling the operation of the height cylinder in a manner that adjusts the vertical positioning of the harvesting implement when the height value differs from the predetermined height setting.

14. The height control system of claim 13, wherein the predetermined height setting is associated with a predetermined height range for the harvesting implement; and
wherein the controller is configured to determine the height control output for controlling the operation of the height cylinder in a manner that adjusts the vertical positioning of the harvesting implement when the height value falls outside the predetermined height range.

15. The height control system of claim 9, wherein the harvesting implement comprises a header configured for use with an agricultural harvester.

16. A height control system for an agricultural vehicle, the system comprising:
a harvesting implement;
a height cylinder configured to adjust a vertical positioning of the harvesting implement relative to a ground surface;
a tilt cylinder configured to adjust a lateral tilt of the harvesting implement relative to the ground surface;
a plurality of height sensors spaced apart relative to the harvesting implement with a known spatial relationship, each height sensor configured to generate height data indicative of a local distance defined between the harvesting implement and the ground surface at a respective location of said height sensor; and
a controller communicatively coupled to the plurality of height sensors, the controller including a processor and associated memory, the memory storing instructions that, when executed by the processor, configure the controller to:
analyze the height data received from the plurality of height sensors in combination with position data associated with the known spatial relationship of the plurality of height sensors to establish a correlation between the height data and the position data;

establish the correlation between the height data and the position data by performing a linear regression analysis, the established correlation being indicative of a regression line fit through a dataset including the height data and the position data;

determine a tilt control output for controlling an operation of the tilt cylinder based on a slope of the regression line; and control the operation of the tilt cylinder based on the tilt control output.

17. The system of claim 16, wherein the controller is further configured to:

determine a height control output for controlling an operation of the height cylinder based on a slope of the regression line; and control the operation of the height cylinder based on the height control output.

* * * * *